United States Patent
Ae' et al.

(10) Patent No.: US 6,216,919 B1
(45) Date of Patent: Apr. 17, 2001

(54) MEASURED LIQUID DISPENSING CAP ASSEMBLY

(76) Inventors: Lary Ae', 7451 Warner Ave., #E377, Huntington Beach, CA (US) 92647; Regina Rossi Wilkerson, 16397 Del Oro Cir., Huntington Beach, CA (US) 92649

( * ) Notice: Subject to any disclaimer, the term of this patent is extended or adjusted under 35 U.S.C. 154(b) by 0 days.

(21) Appl. No.: 09/397,261

(22) Filed: Sep. 16, 1999

(51) Int. Cl.[7] .................................................. B67D 5/38
(52) U.S. Cl. ....................... 222/158; 222/442; 222/450; 222/559
(58) Field of Search ..................... 222/158, 442, 222/450, 484, 531, 537, 559, 454

(56) References Cited

U.S. PATENT DOCUMENTS

| | | |
|---|---|---|
| D. 244,426 | 5/1977 | Lowe . |
| 1,553,113 * | 9/1925 | Rutt ................................. 222/484 X |
| 2,416,811 * | 3/1947 | Bailey ................................. 222/450 |
| 2,530,012 | 11/1950 | Gronemeyer et al. . |
| 2,602,576 * | 7/1952 | Spruck ............................. 222/450 X |
| 2,971,680 * | 2/1961 | Wilson et al. ................... 222/484 X |
| 2,985,343 * | 5/1961 | Mask .................................. 222/442 |
| 3,005,578 * | 10/1961 | Mainieri .............................. 222/450 |
| 3,141,578 * | 7/1964 | Quinn .............................. 222/559 X |
| 3,141,579 * | 7/1964 | Medlock .......................... 222/450 X |
| 3,141,585 | 7/1964 | Emmert . |
| 4,314,657 * | 2/1982 | Perakis et al. .................. 222/442 X |
| 4,830,226 | 5/1989 | Kong . |
| 5,165,576 * | 11/1992 | Hickerson ............................ 222/158 |
| 5,301,845 | 4/1994 | Labonte . |
| 5,381,930 | 1/1995 | Kalabakas . |

FOREIGN PATENT DOCUMENTS

0446805 * 9/1991 (IT) ................................. 222/450 X

* cited by examiner

Primary Examiner—Kevin Shaver
Assistant Examiner—Eric Keasel

(57) ABSTRACT

A measured liquid dispensing cap assembly for dispensing a selectable amount of liquid from a bottle. The measured liquid dispensing cap assembly includes a cap assembly having a measuring chamber, a slidable dispenser arm, a slidable dispenser spout, and an attachment device for coupling the cap assembly to a bottle. In an embodiment, the attachment device includes a threaded portion for coupling to a complimentary threaded portion of the bottle. In another embodiment, the attachment device includes a ratcheted constrictor portion and a release pin.

6 Claims, 4 Drawing Sheets

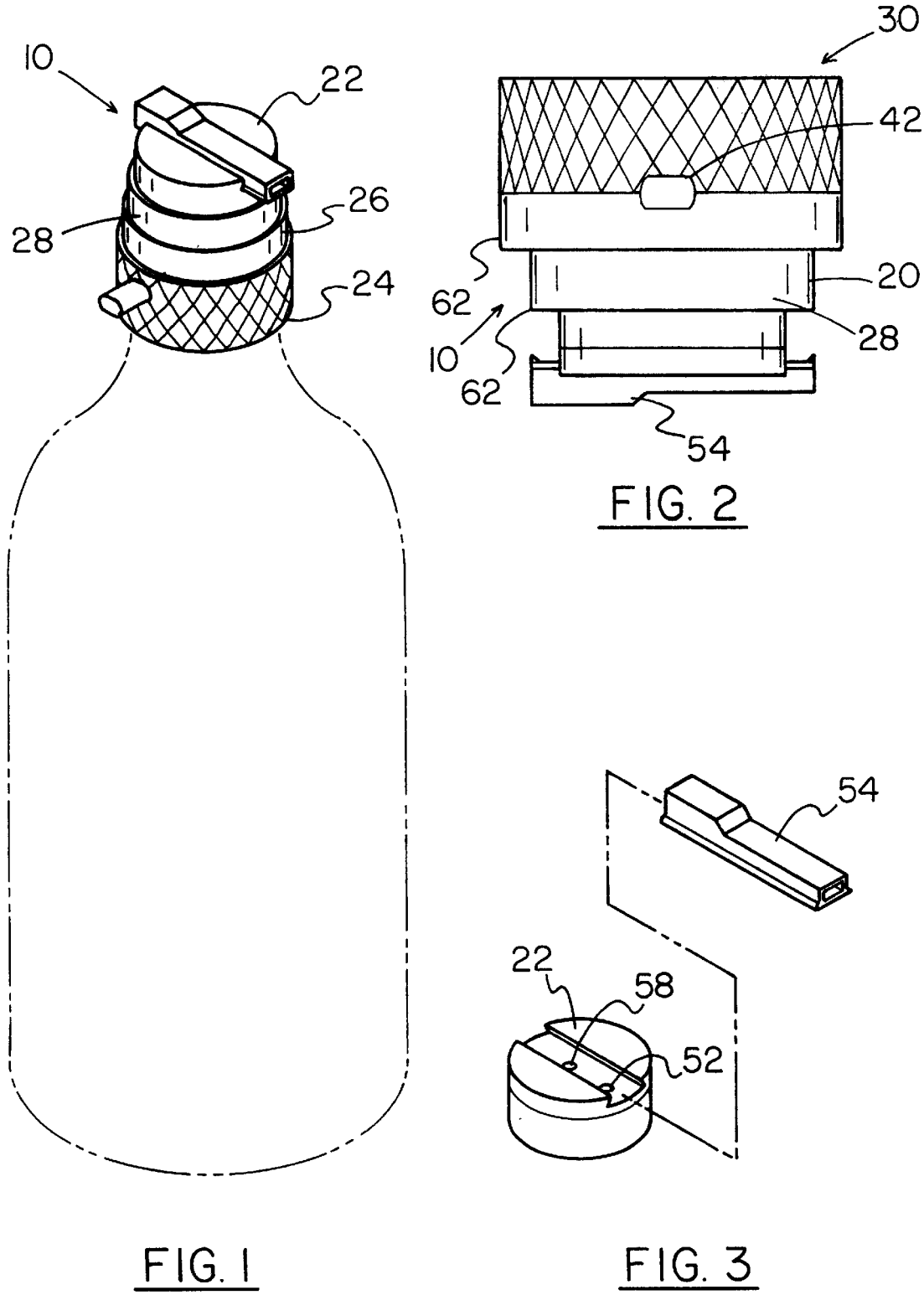

MEASURED LIQUID DISPENSING CAP ASSEMBLY

BACKGROUND OF THE INVENTION

1. Field of the Invention

The present invention relates to liquid dispensers and more particularly pertains to a new measured liquid dispensing cap assembly for dispensing a selectable amount of liquid from a bottle.

2. Description of the Prior Art

The use of liquid dispensers is known in the prior art. More specifically, liquid dispensers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 5,381,930; 4,830,226; 3,141,585; 5,301,845; 2,530,012; and U.S. Pat. No. Des. 244,426.

While these devices fulfill their respective, particular objectives and requirements, the aforementioned patents do not disclose a new measured liquid dispensing cap assembly. The inventive device includes a cap assembly having a measuring chamber, a slidable dispenser arm, a slidable dispenser spout, and an attachment device for coupling the cap assembly to a bottle. In an embodiment, the attachment device includes a threaded portion for coupling to a complimentary threaded portion of the bottle.

In these respects, the measured liquid dispensing cap assembly according to the present invention substantially departs from the conventional concepts and designs of the prior art, and in so doing provides an apparatus primarily developed for the purpose of dispensing a selectable amount of liquid from a bottle.

SUMMARY OF THE INVENTION

In view of the foregoing disadvantages inherent in the known types of liquid dispensers now present in the prior art, the present invention provides a new measured liquid dispensing cap assembly construction wherein the same can be utilized for dispensing a selectable amount of liquid from a bottle.

The general purpose of the present invention, which will be described subsequently in greater detail, is to provide a new measured liquid dispensing cap assembly apparatus and method which has many of the advantages of the liquid dispensers mentioned heretofore and many novel features that result in a new measured liquid dispensing cap assembly which is not anticipated, rendered obvious, suggested, or even implied by any of the prior art liquid dispensers, either alone or in any combination thereof.

To attain this, the present invention generally comprises a cap assembly having a measuring chamber, a slidable dispenser arm, a slidable dispenser spout, and an attachment device for coupling the cap assembly to a bottle. In an embodiment, the attachment device includes a threaded portion for coupling to a complimentary threaded portion of the bottle. In another embodiment, the attachment device includes a ratcheted constrictor portion and a release pin.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new measured liquid dispensing cap assembly apparatus and method which has many of the advantages of the liquid dispensers mentioned heretofore and many novel features that result in a new measured liquid dispensing cap assembly which is not anticipated, rendered obvious, suggested, or even implied by any of the prior art liquid dispensers, either alone or in any combination thereof.

It is another object of the present invention to provide a new measured liquid dispensing cap assembly that may be easily and efficiently manufactured and marketed.

It is a further object of the present invention to provide a new measured liquid dispensing cap assembly that is of a durable and reliable construction.

An even further object of the present invention is to provide a new measured liquid dispensing cap assembly which is susceptible of a low cost of manufacture with regard to both materials and labor, and which accordingly is then susceptible of low prices of sale to the consuming public, thereby making such measured liquid dispensing cap assembly economically available to the buying public.

Still yet another object of the present invention is to provide a new measured liquid dispensing cap assembly which provides in the apparatuses and methods of the prior art some of the advantages thereof, while simultaneously overcoming some of the disadvantages normally associated therewith.

Still another object of the present invention is to provide a new measured liquid dispensing cap assembly for dispensing a selectable amount of liquid from a bottle.

Yet another object of the present invention is to provide a new measured liquid dispensing cap assembly which includes a cap assembly having a measuring chamber, a slidable dispenser arm, a slidable dispenser spout, and an attachment device for coupling the cap assembly to a bottle.

In an embodiment, the attachment device includes a threaded portion for coupling to a complimentary threaded portion of the bottle. In another embodiment, the attachment device includes a ratcheted constrictor portion and a release pin.

Still yet another object of the present invention is to provide a new measured liquid dispensing cap assembly that permits measuring a discrete amount of liquid to be dispensed without having to open a bottle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a new measured liquid dispensing cap assembly according to the present invention.

FIG. 2 is an inverted side view of the present invention.

FIG. 3 is a perspective view of the slidable spout of the as it couples to the top portion of the present invention.

DESCRIPTION OF THE PREFERRED EMBODIMENT

Figure 4:
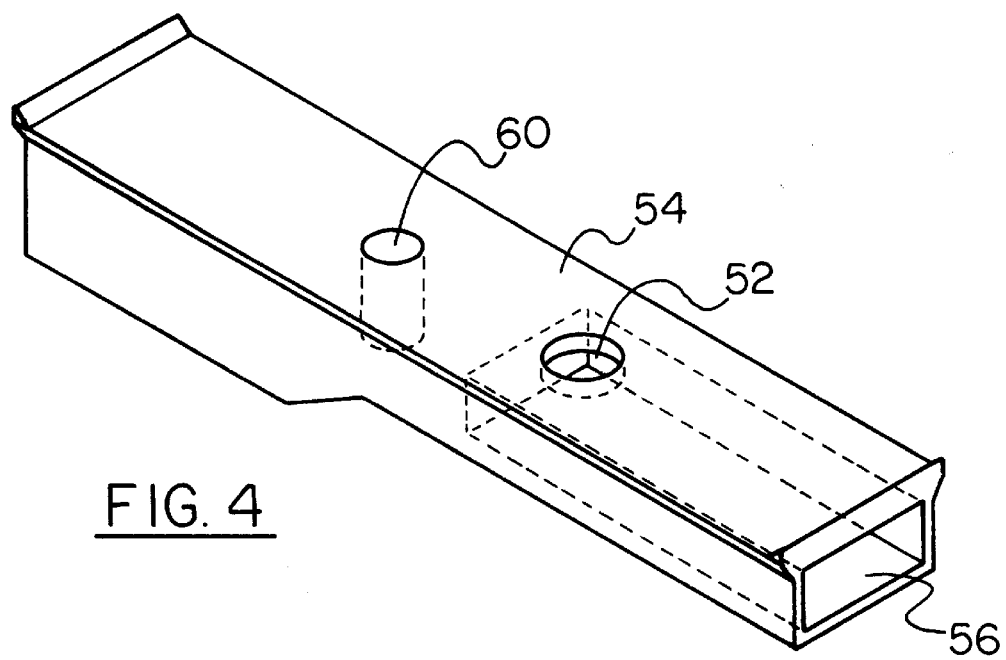
FIG. 4 is a perspective view of the spout of the present invention.
Figure 5:
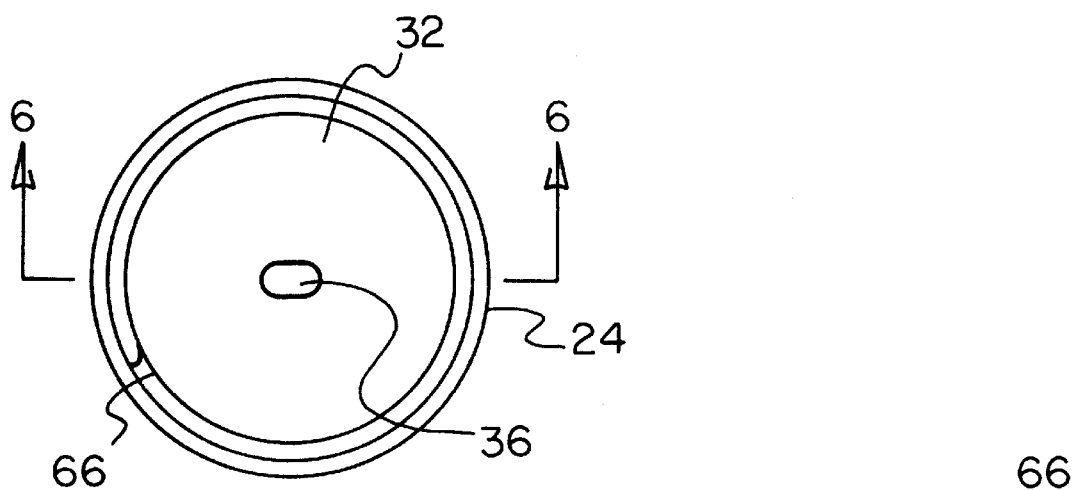
FIG. 5 is a bottom view of the present invention.
Figure 6:
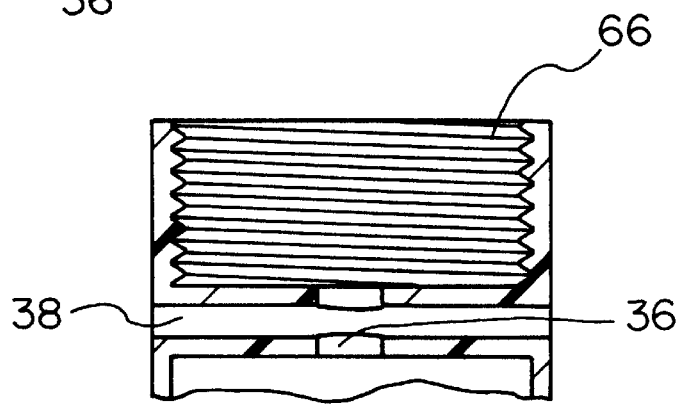
FIG. 6 is a cross-sectional view of the invention taken along line 6—6 in FIG. 5.
Figure 7:
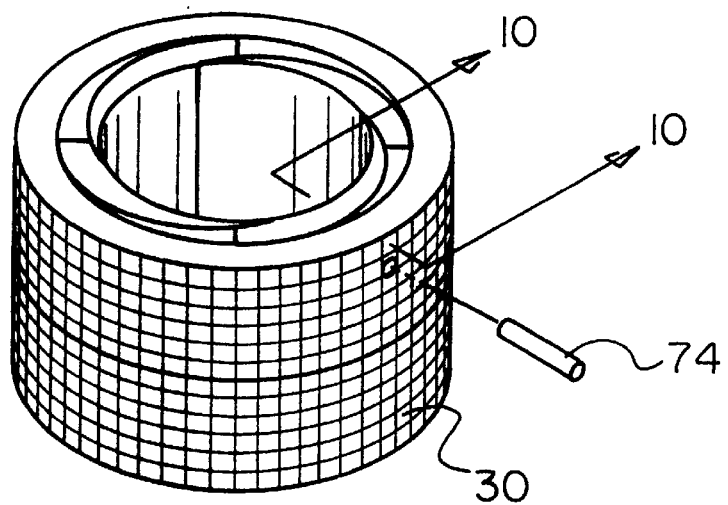
FIG. 7 is a perspective view of the ratchet assembly of an alternate embodiment of the present invention.
Figure 8:
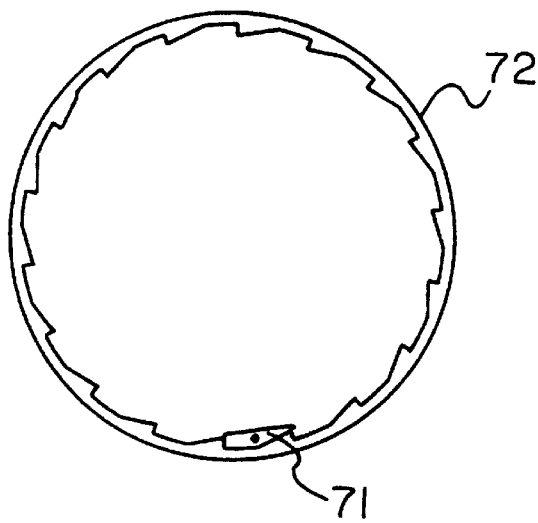
FIG. 8 is a bottom view of the constrictor portion and pivot member.
Figure 9:
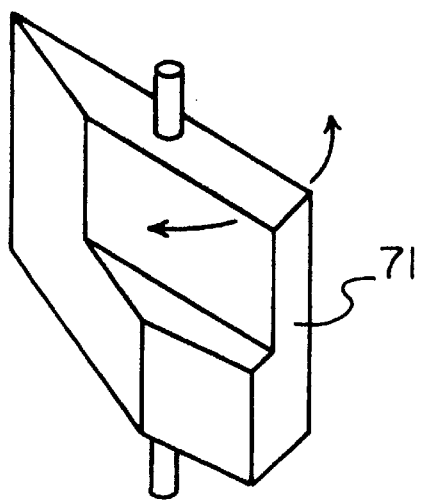
FIG. 9 is a perspective view of the pivot member.
Figure 10:
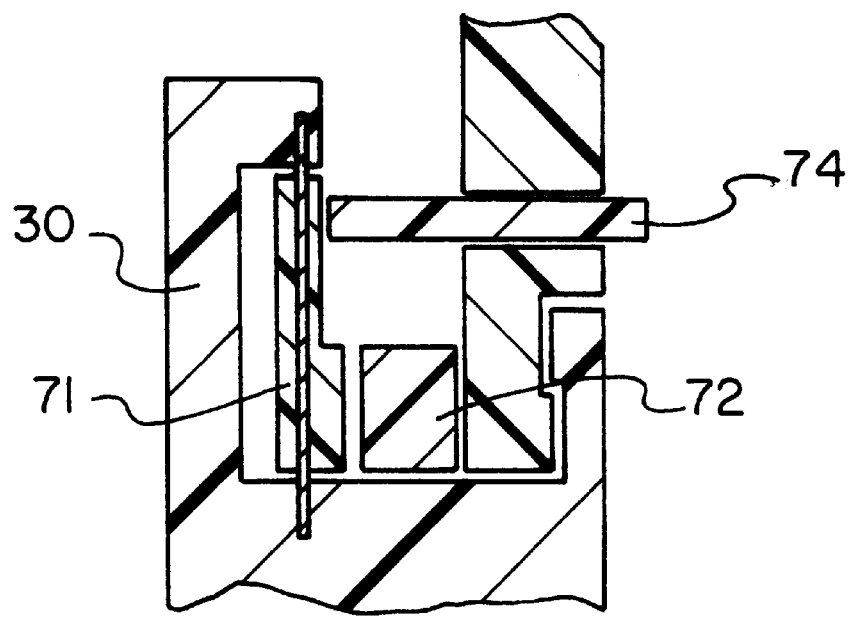
FIG. 10 is a cross-sectional view of the alternate embodiment taken along line 10—10 of FIG. 7.
Figure 11:
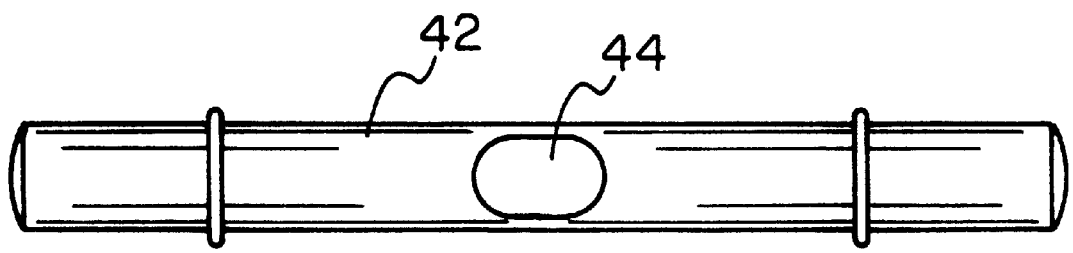
FIG. 11 is a top view of the dispenser arm.

With reference now to the drawings, and in particular to FIGS. 1 through 11 thereof, a new measured liquid dispensing cap assembly embodying the principles and concepts of the present invention and generally designated by the reference numeral 10 will be described.

As best illustrated in FIGS. 1 through 10, the measured liquid dispensing cap assembly 11 generally comprises a main member 20 that has a closed top portion 22, an open bottom portion 24, and a perimeter wall 26. The perimeter wall extends between the top portion and the bottom portion to form a measuring chamber 28 defined by the perimeter wall, the top portion, and the bottom portion.

The bottom portion further includes an attachment portion 30 designed for coupling the main member to a bottle. The main member further has a throat portion 32 extending inwardly from the perimeter wall between the measuring chamber and the bottom portion such that the throat portion is designed for positioning adjacent to the opening of the bottle when the main member is coupled to the bottle.

The throat portion is structured to include a dispensing hole 36 that extends between the open bottom and the measuring chamber. The throat portion further has a dispenser arm conduit 38 that extends through the perimeter walls and through a middle portion of the dispensing hole.

A dispenser arm 42 has a medial neck portion 44. The dispenser arm is positionable within the dispenser arm conduit such that the dispenser arm is slidable between an open position and a closed position. The open position is defined by the medial neck portion being positioned within the dispensing hole such that a liquid in the bottle is dispensable through the dispensing hole. The closed position is defined by the dispenser arm blocking the dispensing hole such that a liquid is prevented from passing through the dispensing hole.

The closed top portion has a spout aperture 52 extending from the measuring chamber through the top portion. A dispenser spout 54 is slidably coupled to the top portion and has a spout conduit 56 selectively alignable with the spout aperture. Thus, the dispenser spout is designed for permitting a fluid to pass from the measuring chamber through the dispenser hole into the spout conduit when the dispenser spout is in an open spout position.

In an embodiment, the top portion has a venting aperture 58 extending from the measuring chamber through the top portion. The dispenser spout has an air conduit 60 selectively alignable with the venting aperture to define an open spout position for permitting air to enter the measuring chamber when the dispenser spout is in the open spout position.

In an embodiment, the perimeter walls are graduated such that gradations 62 in the perimeter walls correspond to selectable amounts of liquid within the measuring chamber. The perimeter walls are generally transparent such that the measuring chamber is designed to permit a user to see a level of fluid in the measuring chamber.

In an embodiment, the attachment portion includes threading 66 designed for coupling to a threaded portion of the bottle.

In an alternate embodiment, the attachment portion includes a ratchet assembly 70 and a constrictor portion 72. The ratchet assembly is designed for permitting rotation of the bottom portion of the main member and the ratchet assembly is operationally coupled to the constrictor portion. The constrictor portion is designed for tightening around the opening of the bottle when the bottom portion of the main member is rotated. A release pin 74 is provided for releasing the ratchet assembly to loosen the constrictor portion for removing the attachment portion from the bottle.

In an alternate embodiment, the attachment portion includes a ratchet assembly 70 and a constrictor portion 72. The ratchet assembly is designed for permitting rotation of the bottom portion of the main member and the ratchet assembly is operationally coupled to the constrictor portion. The constrictor portion is designed for tightening around the opening of the bottle when the bottom portion of the main member is rotated. A release pin 74 is provided for releasing the ratchet assembly to loosen the constrictor portion for removing the attachment portion from the bottle.

The ratchet assembly includes a pivot member 71 for engaging the constrictor portion. The release pin is positioned to pivot the pivot member to disengage the pivot member from the constrictor ring to permit removal of the attachment portion from the bottle.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A measured liquid dispensing cap assembly for dispensing a selectable amount of liquid from a bottle, the bottle having an opening, the cap assembly comprising:

a main member having a measuring chamber, said main member being adapted for coupling to the opening of the bottle such that a selectable amount of liquid is dispensable from the bottle into the measuring chamber;

said main member having a top portion having a spout aperture adapted for dispensing the liquid from the measuring chamber through the spout aperture;

a dispenser arm coupled to said top portion of said main member for selectively covering said spout aperture whereby said spout aperture is adapted for sealing to prevent liquid from being dispensed from said measuring chamber through said spout aperture; and said measuring chamber having a perimeter wall, said perimeter wall being graduated such that gradations in said perimeter wall correspond to selectable amounts of liquid within said measuring chamber, each of said gradations of said perimeter wall having a cross-sectional area in a plane perpendicular to an axis of said main member such that said cross-sectional area of each of said gradations is different than said cross-sectional area of adjacent said gradations whereby said gradations are adapted for providing greater precision when measuring the selectable amounts of the liquid.

2. The measure liquid dispensing cap assembly of claim 1, further comprising:

said top portion having a dispenser arm conduit, said hole extending between said dispenser arm conduit and said measuring chamber;

said dispenser arm including a medial neck portion, said dispenser arm being positionable within said dispenser arm conduit, said dispenser arm being slidable between an open position and a closed position, said open position being defined by said medial neck portion being positioned adjacent said dispensing hole whereby a liquid in the bottle is dispensable through the dispensing hole, said closed position being defined by said dispenser arm blocking said dispensing hole whereby a liquid is prevented from passing through said dispensing hole.

3. A measured liquid dispensing cap assembly for dispensing a selectable amount of liquid from a bottle, the bottle having an opening, the cap assembly comprising:

a main member having a closed top portion, an open bottom portion, and a perimeter wall extending between said top portion and said bottom portion to form a measuring chamber defined by said perimeter wall, said top portion, and said bottom portion;

said bottom portion further having an attachment portion adapted for coupling the main member to the bottle, said main member further having a throat portion extending inwardly from said perimeter wall between said measuring chamber and said bottom portion such that said throat portion is adapted for positioning adjacent to the opening of the bottle when the main member is coupled to the bottle;

said throat portion being structured to include a dispensing hole, said dispensing hole extending between said open bottom and said measuring chamber, said throat portion further having a dispenser arm conduit extending through said perimeter walls and through said dispensing hole;

a dispenser arm having a medial neck portion, said dispenser arm being positionable within said dispenser arm conduit, said dispenser arm being slidable between an open position and a closed position, said open position being defined by said medial neck portion being positioned within said dispensing hole whereby a liquid in the bottle is dispensable through the dispensing hole, said closed position being defined by said dispenser arm blocking said dispensing hole whereby a liquid is prevented from passing through said dispensing hole;

said closed top portion having a spout aperture extending from said measuring chamber through said top portion; and a dispenser spout slidably coupled to said top portion, said dispenser spout having a spout conduit selectively alignable with said spout aperture such that said dispenser spout is adapted for permitting a fluid to pass from said measuring chamber through said spout aperture into said spout conduit when said dispenser spout is in an open spout position;

said perimeter wall being generally transparent such that said measuring chamber is adapted to permit a user to see a level of fluid in said measuring chamber; and wherein said perimeter wall is graduated such that gradations in said perimeter wall correspond to selectable amounts of liquid within said measuring chamber, each of said gradations of said perimeter wall having a cross-sectional area taking perpendicular to an axis of said main member such that said cross-sectional area of each of said gradations is different than said cross-sectional area of adjacent said gradations whereby said gradations are adapted for providing greater precision when measuring the selectable amounts of the liquid.

4. The cap assembly of claim 3, further comprising:

said top portion having a venting aperture extending from said measuring chamber through said top portion; and said dispenser spout having an air conduit selectively alignable with said venting aperture to define an open spout position for permitting air to enter said measuring chamber when said dispenser spout is in said closed spout position.

5. The cap assembly of claim 3, wherein said attachment portion includes threading adapted for coupling to a threaded portion of the bottle.

6. A measured liquid dispensing cap assembly for dispensing a selectable amount of liquid from a bottle, the bottle having an opening, the cap assembly comprising:

a main member having a closed top portion, an open bottom portion, and a perimeter wall extending between said top portion and said bottom portion to form a measuring chamber defined by said perimeter wall, said top portion, and said bottom portion;

said bottom portion further having an attachment portion adapted for coupling the main member to the bottle, said main member further having a throat portion extending inwardly from said perimeter wall between said measuring chamber and said bottom portion such that said throat portion is adapted for positioning adjacent to the opening of the bottle when the main member is coupled to the bottle;

said throat portion being structured to include a dispensing hole, said dispensing hole extending between said open bottom and said measuring chamber, said throat portion further having a dispenser arm conduit extending through said perimeter walls and through said dispensing hole;

a dispenser arm having a medial neck portion, said dispenser arm being positionable within said dispenser arm conduit, said dispenser arm being slidable between an open position and a closed position, said open position being defined by said medial neck portion being positioned within said dispensing hole whereby a liquid in the bottle is dispensable through the dispensing hole, said closed position being defined by said dispenser arm blocking said dispensing hole whereby a liquid is prevented from passing through said dispensing hole;

said closed top portion having a spout aperture extending from said measuring chamber through said top portion;

a dispenser spout slidably coupled to said top portion, said dispenser spout having a spout conduit selectively alignable with said spout aperture such that said dispenser spout is adapted for permitting a fluid to pass from said measuring chamber through said dispenser hole into said spout conduit when said dispenser spout is in an open spout position;

said top portion having a venting aperture extending from said measuring chamber through said top portion;

said dispenser spout having an air conduit selectively alignable with said venting aperture to define a open spout position for permitting air to enter said measuring chamber when said dispenser spout is in said closed spout position;

said perimeter wall being generally transparent such said measuring chamber is adapted to permit a user to see a level of fluid in said measuring chamber;

wherein said perimeter wall is graduated such that gradations in said perimeter wall correspond to selectable amounts of liquid within said measuring chamber, each of said gradations of said perimeter wall having a cross-sectional area taking perpendicular to an axis of said main member such that said cross-sectional area of each of said gradations is different than said cross-sectional area of adjacent said gradations adapted for providing greater precision when measuring the selectable amounts of the liquid; and wherein said attachment portion includes threading adapted for coupling to a threaded portion of the bottle.

* * * * *